US012013770B2

(12) United States Patent
Panikkar et al.

(10) Patent No.: US 12,013,770 B2
(45) Date of Patent: Jun. 18, 2024

(54) SMART SELECTION OF TEST SCRIPTS FOR COMMODITY TESTING ON MANUFACTURING FLOOR

(71) Applicant: Dell Products L.P., Round Rock, TX (US)

(72) Inventors: Shibi Panikkar, Bandalore (IN); Shanir Anshul, Hyderabad (IN); Sudeshna Dash, Hyderabad (IN); Tuck Meng Chin, Singapore (SG); Dong Ji, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 310 days.

(21) Appl. No.: 17/426,975

(22) PCT Filed: Feb. 1, 2019

(86) PCT No.: PCT/US2019/016334
§ 371 (c)(1),
(2) Date: Jul. 29, 2021

(87) PCT Pub. No.: WO2020/159539
PCT Pub. Date: Aug. 6, 2020

(65) Prior Publication Data
US 2022/0156168 A1    May 19, 2022

(51) Int. Cl.
*G06F 11/00* (2006.01)
*G06F 11/263* (2006.01)
(Continued)

(52) U.S. Cl.
CPC ........ *G06F 11/263* (2013.01); *G06F 11/2733* (2013.01); *G06F 11/277* (2013.01); *G06N 20/00* (2019.01)

(58) Field of Classification Search
CPC ... G06F 11/263; G06F 11/2733; G06F 11/277
See application file for complete search history.

(56) References Cited

U.S. PATENT DOCUMENTS 7,050,922 B1 * 5/2006 Zhou .............. G01R 31/318307
700/121
2012/0266023 A1  10/2012 Brown et al.
(Continued)

OTHER PUBLICATIONS

Notification Concerning Transmittal of International Preliminary Report on Patentability mailed from the International Bureau on Aug. 12, 2021 for International Application No. PCT/US2019/016334, International Filing Date Feb. 1, 2019, 8 pages.

*Primary Examiner* — Philip Guyton
(74) *Attorney, Agent, or Firm* — Krishnendu Gupta; Deepika Bhayana; Lesley A. Leonessa

(57) ABSTRACT

In product testing, a script prioritization tool (102) is used to intelligently prioritize the execution sequence of test scripts. This tool creates a repository of test outputs from the executions of test scripts and analyzes the outputs to train and deploy a machine learning, ML, model that defines the priority of the scripts that may need to be executed and the scripts whose execution may be skipped without affecting the quality of testing. Scripts that are more likely to fail and/or are time consuming to execute are prioritized, while other scripts may be skipped. The ML model ranks the scripts based on the average execution time of the script, a count of the execution failures of the script, a count of the number of execution retries for the script, and the most recent failure time of the script. The scripts can be executed based on their rankings for efficiency and time-saving.

13 Claims, 7 Drawing Sheets

(51) Int. Cl.
    *G06F 11/273*     (2006.01)
    *G06F 11/277*     (2006.01)
    *G06N 20/00*     (2019.01)

(56) References Cited

U.S. PATENT DOCUMENTS

| | | | |
|---|---|---|---|
| 2013/0102091 A1* | 4/2013 | King | G01R 31/01 324/750.24 |
| 2015/0081598 A1 | 3/2015 | Depizzol et al. | |

* cited by examiner

| Test Script | Product Family | Vendor | Host System | Operator | FAI | Volume | Execution |
|---|---|---|---|---|---|---|---|
| S1 | ABC | V1 | System 1 | User 1 | 20 | 1000 | 44 |
| S2 | ABC | V1 | System 1 | User 1 | 20 | 1000 | 44 |
| S3 | ABC | V1 | System 1 | User 1 | 20 | 1000 | 44 |
| S4 | ABC | V1 | System 1 | User 1 | 20 | 1000 | 44 |
| S5 | ABC | V1 | System 1 | User 1 | 20 | 1000 | 44 |
| S6 | ABC | V1 | System 1 | User 1 | 20 | 1000 | 44 |
| S7 | ABC | V1 | System 1 | User 1 | 20 | 1000 | 44 |
| S8 | ABC | V2 | System 1 | User 1 | 20 | 1000 | 44 |
| S9 | ABC | V1 | System 1 | User 1 | 20 | 1000 | 44 |
| S10 | ABC | V1 | System 1 | User 1 | 20 | 1000 | 44 |

|    | Script Name | Part# | PPID | Fail Time | Time Diff. in Hours | Avg. Execution Time (sec) |
|----|------|---------|-------------|---------------------|-----|-----|
| 1  | S6   | 123-121 | 123-121-196 | 2018-06-12 15:18:08 | 382 | 450 |
| 2  | S4   | 123-121 | 123-121-198 | 2018-06-07 11:57:33 | 506 | 270 |
| 3  | S1   | 123-121 | 123-121-198 | 2018-06-03 09:21:18 | 604 | 450 |
| 4  | S4   | 123-121 | 123-121-198 | 2018-06-21 08:14:29 | 174 | 270 |
| 5  | S6   | 123-121 | 123-121-198 | 2018-06-21 17:37:40 | 164 | 450 |
| 6  | S5   | 123-121 | 123-121-198 | 2018-06-22 14:28:45 | 143 | 210 |
| 7  | S6   | 123-121 | 123-121-196 | 2018-06-07 14:12:37 | 504 | 450 |
| 8  | S7   | 123-121 | 123-121-198 | 2018-06-06 09:59:36 | 532 | 500 |
| 9  | S6   | 123-121 | 123-121-198 | 2018-06-20 19:46:16 | 186 | 450 |
| 10 | S1   | 123-121 | 123-121-198 | 2018-06-19 11:30:54 | 218 | 450 |
| 11 | S7   | 123-121 | 123-121-198 | 2018-06-10 14:05:42 | 432 | 500 |
| 12 | S7   | 123-121 | 123-121-198 | 2018-06-07 13:49:26 | 504 | 500 |
| 13 | S1   | 123-121 | 123-121-196 | 2018-06-25 13:00:46 | 73  | 450 |
| 14 | S6   | 123-121 | 123-121-198 | 2018-06-22 12:20:18 | 145 | 450 |
| 15 | S6   | 123-121 | 123-121-198 | 2018-06-20 12:13:32 | 194 | 450 |
| 16 | S5   | 123-121 | 123-121-198 | 2018-06-20 18:16:42 | 188 | 210 |
| 17 | S2   | 123-121 | 123-121-198 | 2018-06-23 19:56:47 | 114 | 350 |
| 18 | S1   | 123-121 | 123-121-198 | 2018-06-16 17:29:36 | 284 | 450 |
| 19 | S4   | 123-121 | 123-121-198 | 2018-06-07 15:53:51 | 502 | 270 |
| 20 | S1   | 123-121 | 123-121-198 | 2018-06-23 10:44:41 | 123 | 450 |

|  | Script S5 | Script S6 | Script S7 |
|---|---|---|---|
| Ordered List (of error times) | 39, 51, 86, 113, 136, 184, 214, 233, 278, 335, 381, 500, 519, 545, 599, 623, 664 | 66, 89, 95, 99, 113, 165, 170, 281, 288, 314, 356, 363, 376, 433, 447, 475, 520, 523, 528, 550, 594, 597, 603, 619, 646, 649, 663 | 47, 88, 116, 142, 143, 187, 236, 239, 290, 304, 337, 374, 380, 595, 640, 663, 665 |
| Total # of times error | 17 | 27 | 17 |
| Avg. Execution Time | 210 | 450 | 500 |

FIG. 9A ← 900

| Quantile Range | Total # S5 failure | Total # S6 failure | Total # S7 failure |
|---|---|---|---|
| 0-10% | 3 | 3 | 2 |
| 10-20% | 2 | 2 | 2 |
| 20-30% | 1 | 2 | 2 |
| 30-40% | 3 | 0 | 2 |
| 40-50% | 0 | 3 | 2 |
| 50-60% | 1 | 3 | 3 |
| 60-70% | 1 | 3 | 0 |
| 70-80% | 3 | 4 | 0 |
| 80-90% | 2 | 4 | 1 |
| 90-100% | 1 | 3 | 3 |
| Failure Count Rank | 1 | 2 | 1 |

902 → FIG. 9B

| Impacting Criteria | Weightage Factor (WF) | Script S5 Rating (R) | Script S5 Score (WF*R) | Script S6 Rating (R) | Script S6 Score (WF*R) | Script S7 Rating (R) | Script S7 Score (WF*R) |
|---|---|---|---|---|---|---|---|
| Execution Time | 0.40 | 1 | 0.40 | 2 | 0.80 | 3 | 1.20 |
| Fail Count | 0.10 | 1 | 0.10 | 2 | 0.20 | 1 | 0.10 |
| Retry Frequency | 0.30 | 1 | 0.30 | 2 | 0.60 | 3 | 0.90 |
| Recent Failure | 0.20 | 1 | 0.20 | 3 | 0.60 | 2 | 0.40 |
| Total Score |  |  | 1.0 |  | 2.20 |  | 2.60 |
| Final Rank |  | 3 |  | 2 |  | 1 |  |

FIG. 9C ← 904

SMART SELECTION OF TEST SCRIPTS FOR COMMODITY TESTING ON MANUFACTURING FLOOR

TECHNICAL FIELD

This disclosure relates generally to testing of components of an electronic system and, more particularly, to an Artificial Intelligence (AI) based component-testing environment in which a prioritization tool is deployed to intelligently prioritize execution of those test scripts that are more likely to fail during execution and that may be time consuming to execute, while skipping the execution of other test scripts that may not be executed.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems include many different types of consumer and commercial electronic devices such as, for example, personal computers (e.g., desktops or laptops), tablet computers, mobile devices (e.g., personal digital assistants (PDAs) or smart phones), corporate (or small business) server and data processing systems, and the like. These devices may vary in size, shape, performance, functionality, and price. In any event, almost all of these modern devices are equipped with relevant hardware and software to allow their users to access a number of different websites over the Internet and perform online transactions.

Different types of information handling systems include different types of hardware components manufactured by different vendors/manufacturers and received from different third-party suppliers (or directly from vendors). In the product manufacturing/assembly environment, the hardware components of each information handling system may need to be tested—individually and, preferably, as part of the overall system—before the information handling system is finally assembled and ready to be shipped. Commodity test is a component test that verifies operational correctness of each component within an electronic system (or information handling system). Each component is tested independently with a set of test scripts, which are software modules/routines designed to test a component's functionality. The electronic system itself also may be tested after all individually-tested components are assembled in the relevant system form. At the time of system design, test engineers may create a repository of test scripts to be tested against each component. The number of test scripts may vary from 10 to 20 scripts for each component. The system may be considered "ready to ship" when all test scripts successfully pass their executions.

SUMMARY

This Summary provides a simplified form of concepts that are further described below in the Detailed Description. This Summary is not intended to identify key or essential features and should therefore not be used for determining or limiting the scope of the claimed subject matter.

The present disclosure relates to a product testing environment in which a test script prioritization tool—a software application—is used to intelligently prioritize the execution sequence of test scripts. This AI based tool trains and deploys a machine learning (ML) model that defines the priority of the scripts to be executed and the scripts whose execution may be safely skipped without affecting the quality of testing. In particular embodiments, scripts are selected for execution based on a "fail fast" approach in which scripts that are more likely to fail during execution and/or the scripts that are time consuming to execute are prioritized for execution, while other scripts may be skipped. The ML model may evaluate execution performance of all test scripts associated with a component or unit under test and rank the test scripts for execution based on a number of pre-defined criteria such as, for example, the average execution time of the script, a count of the execution failures of the script, a count of the number of execution retries for the script if the same Piece Part Identification (PPID) (associated with a part number for the part under test) fails more than once, and the most recent failure time of the script. Because of the selective executions of test scripts as per teachings of the present disclosure, excessive (and often unnecessary) testing may be avoided. In case of large scale product manufacturing and/or assembly operations, this can translate into significant savings in the overall product shipment time and reduce manufacturing backlog.

In one embodiment, the present disclosure is directed to a method, which comprises: (i) determining, by a computing system, that a unit is to be tested through execution of a set of unit-specific test scripts; (ii) identifying, by the computing system, one or more test scripts in the set having at least one of the following two attributes: (a) the identified test script is more likely to fail during execution, and (b) the identified test script are time consuming to execute; and (iii) testing, by the computing system, the unit by executing the identified one or more test scripts while skipping the execution of the remaining test scripts in the set.

In another embodiment, the present disclosure is directed to a computing system, which comprises: a memory storing program instructions; and a processing unit coupled to the memory and operable to execute the program instructions. In the computing system, the program instructions, when executed by the processing unit, cause the computing system to: (i) determine that a unit is to be tested through execution of a set of unit-specific test scripts; (ii) identify one or more test scripts in the set having at least one of the following two attributes: (a) the identified test script is more likely to fail during execution, and (b) the identified test script may need a long time to execute; and (iii) test the unit by executing the identified one or more test scripts while skipping the execution of the remaining test scripts in the set.

In a further embodiment, the present disclosure is directed to a computer program product comprising a non-transitory computer-usable medium having computer-readable program code embodied therein, wherein the computer-readable program code is adapted to be executed by a computing system to implement a method. The method comprises: (a) determining that a unit is to be tested through execution of a set of unit-specific test scripts; (ii) identifying one or more test scripts in the set having at least one of the following two attributes: (a) the identified test script is more likely to fail during execution, and (b) the identified test script are time consuming to execute; and (iii) testing the unit by executing the identified one or more test scripts while skipping the execution of the remaining test scripts in the set.

With increasing sophistication of modern information handling systems, manufacturing industry is facing the issue of how to expedite testing of complex electronic components in an information handling system and make the testing process more efficient. The test script prioritization tool as per teachings of the present disclosure creates a repository of test outputs from the executions of various test scripts and smartly analyzes these test results to develop insights that help the operator prioritize the executions of test scripts in an efficient and time-saving manner Test scripts that are not prone to frequent failures and do not take a long time to execute may be safely bypassed in future testing operations. On the other hand, test scripts that are likely to fail or take a long time to execute may be prioritized for execution for a given commodity. This selective execution approach saves time during testing, without sacrificing the quality of testing.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

FIG. 7 is an exemplary table containing sample failure data of certain test scripts for use in explaining the ML model-based script ranking functionality of the script ranking module of FIG. 3 as per particular embodiments of the present disclosure.

FIGS. 9A-9C provide an exemplary illustration of how the group of test scripts shown in FIG. 8 may be ranked for execution as per particular embodiments of the present disclosure.

DETAILED DESCRIPTION

Figure 1:
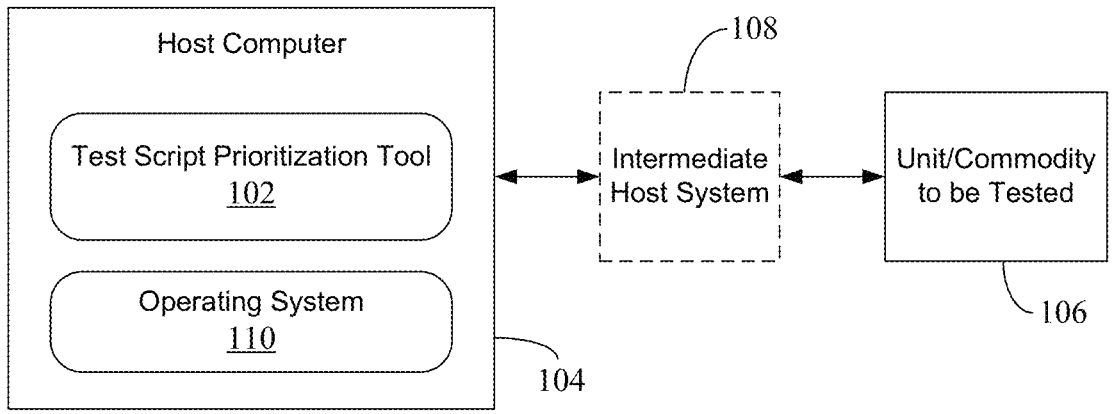
FIG. 1 shows an exemplary arrangement to implement commodity testing using a test script prioritization tool as per particular embodiments of the present disclosure.

For purpose of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touch-screen and/or video display. The information handling system may also include one or more buses operable to transmit communications between the various hardware components.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "unit-specific", "computer-readable", etc.) may be occasionally interchangeably used with its non-hyphenated version (e.g., "unit specific," "computer readable", etc.), and a capitalized entry (e.g., "Operating System", "Host Computer", etc.) may be interchangeably used with its non-capitalized version (e.g., "operating system," "host computer", etc.). Such occasional interchangeable uses shall not be considered inconsistent with each other.

In the discussion herein, the terms "commodity", "component", and "unit" may be used interchangeably to refer to either a component of an electronic system or the electronic system itself, depending on the item under test. For example, an information handling system, such as a personal computer, may include a number of different components like memories, microprocessor(s), a Solid State Drives (SSD) or a Hard Disk Drive (HDD), a display screen or display unit, an optical disk (CD/DVD) drive, and the like. Each of these components or units may be individually tested before finally being operationally attached to the relevant motherboard prior to shipment of the personal computer. The motherboard containing various such components also may be subsequently tested to make sure that the components are compatible with each other and would operate as intended. In that case, the motherboard may be effectively considered the electronic system itself. It is noted that, in the discussion herein, the terms like "test script prioritization tool," "script tool", "prioritization tool", or "software tool" may be used interchangeably as well.

As mentioned before, modern information handling systems include many complex electronic or electromechanical parts/components. The parts may have been manufactured by different vendors/manufacturers and received from different third-party suppliers (or directly from vendors). Furthermore, even though parts may be identical, some of them may be used in one product family whereas others may be installed in a different product family. For example, for a computer product family "X", some 8 GB computer memory units may have been manufactured by SK Hynix and received from a supplier "Sup-1", whereas other 8 GB memories may have been manufactured by and directly received from Samsung. On the other hand, for the product family "Y", all 8 GB computer memories may have been manufactured by Samsung, but received from a different supplier "Sup-2". Typically, in the product assembly environment, each such memory unit is tested using a set of unit-specific test scripts, which, as noted before, may vary from 10 to 20 scripts for each unit. With ever-increasing storage capacity and complexity of memories, SSDs, and HDDs, it is not uncommon for some test scripts to consume a significant amount of time to test the unit. For example, out of a set of 10 scripts to test an 8 GB memory, one script alone may take 39% of the total test time, and the same script may take 35% of the overall test time when used to test a 16 GB memory unit.

Currently, when the execution of an individual script fails, it can lead to multiple executions of the entire set of scripts irrespective of whether some of those scripts have already passed before or not. Furthermore, when a script is partially executed—for example, when the script execution stops after it is 79% complete, it is not possible to carry out only the remaining 21% of execution the next time. Rather, the entire script are to be re-run from the beginning. In case of the scripts that take up a significant portion of the overall test time (as mentioned in the preceding paragraph), the current approach in which a single failure leads to multiple executions of the same set of scripts from the beginning of the test cycle significantly adds extra time in running the scripts and delays the overall product clearance/shipment. Furthermore, current methods of commodity testing lack the automated means of continuous learning (from historical test data/results) to optimize test execution time or the means that could define script prioritization for a vendor or supplier. As a result, if a test operator wishes to expedite the testing process when a script failure is encountered, the operator may have to manually modify the sequence of the scripts with Subject Matter Expert (SME) knowledge and may have to repeat this manual intervention for each script failure. This manual/subjective approach not only adds to the overall End-to-End (E2E) cycle time for testing a batch of products, but it also affects the consistency and accuracy of sequencing of the test scripts.

It is therefore desirable to devise an automated software tool that can smartly analyze the results from executions of various test scripts and provide guidance on how to complete the component-testing faster and more efficiently. In that regard, it is also desirable that the software tool be able to provide intelligent insights into the test data and recommend how to prioritize the executions of test scripts in an efficient, reliable, and time-saving manner, helping the operator to decide which scripts are to be re-executed and which can be safely omitted from execution.

FIG. 1 shows an exemplary arrangement 100 to implement commodity testing using a test script prioritization tool 102 as per particular embodiments of the present disclosure. As mentioned earlier, the terms "test script prioritization tool," "script tool", "prioritization tool", and "software tool" may be used interchangeably herein. The prioritization tool 102 may be a software application comprising program code, which, upon execution by a processor (not shown) in a host computer 104 enables the host computer 104 to prioritize the sequence of test scripts for efficiently testing a unit/commodity 106. As noted before, the commodity or unit 106 under test may be a component of an electronic system or the electronic system itself, depending on the stage of testing during product assembly/manufacture. In particular embodiments, the unit 106 may be directly electrically connected to the host computer 104 during testing. In this configuration, the host computer 104 may perform all of tasks discussed later with reference to FIGS. 2-10. On the other hand, in certain embodiments, an intermediate host system 108 (shown by a dotted block in FIG. 1) may be present to provide an interface between the component 106 to be tested and the host computer 104. In that case, the component 106 may be electrically connected to the intermediate host 108, which then may communicate (or interact) with the host computer 104, as necessary, to carry out the testing of the component 106. In this arrangement, the host computer 104 and the intermediate host system 108 may collectively perform all of tasks discussed later with reference to FIGS. 2-10. For example, in one embodiment, the intermediate host 108 may receive the prioritized list of test scripts from the host computer 104 and actually test the component 106 using the received scripts in the testing order specified by the host computer 104. Throughout testing, the intermediate host 108 may provide test results/data to the host computer 104 to enable the host computer 104 to train an ML model (as discussed later) and to recommend the prioritized list of test script(s) to the intermediate host 108 using the trained ML model (as also discussed later). Other testing arrangements different from the arrangement 100 in FIG. 1 also may be devised to implement the teachings of the present disclosure. However, architectural details of all such testing arrangements are not relevant to the present discussion and, hence, are neither shown nor discussed herein for the sake of brevity.

Figure 11:
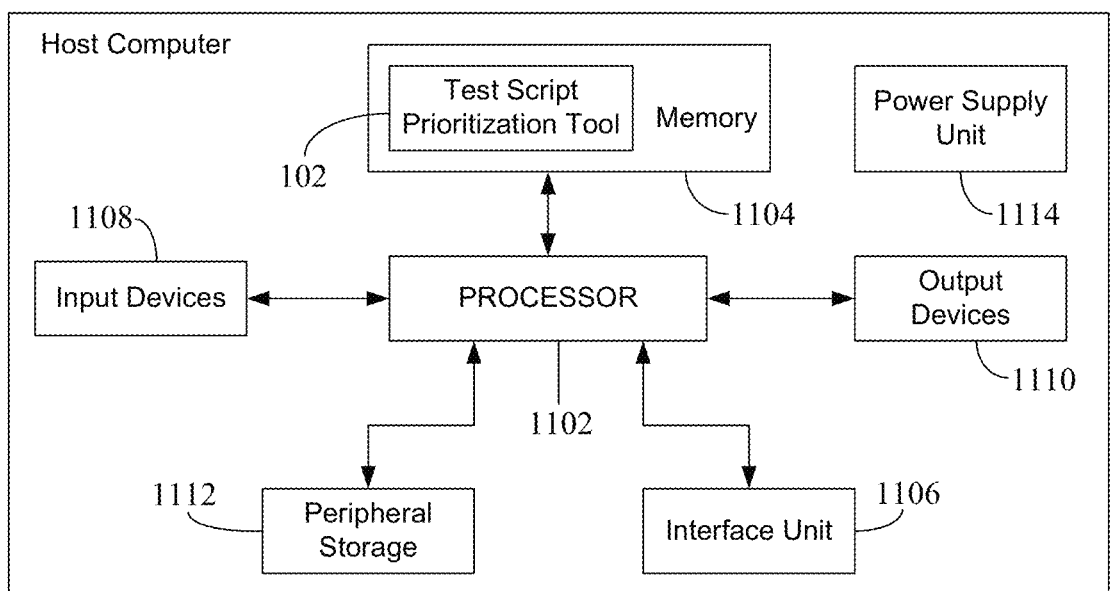
FIG. 11 illustrates an example configuration of a computer system that can be used to implement the test script prioritization tool described herein.

In some embodiments, the host computer 104 and the intermediate host system 108 each may be an information handling system (discussed earlier). The program code constituting the software tool 102 may be stored in a storage unit or memory (not shown) in the host computer 104. Such memory, processor, and other exemplary architectural details of the host computer 104 are shown in FIG. 11 and discussed later below. In some embodiments, the system that directly receives the unit 106—whether the host computer 104 (if the intermediate host system 108 is absent) or the intermediate host system 108—may be configured to provide a testing platform that can emulate the functionality of the actual electronic system into which the unit 106 would be eventually assembled for shipment. The architectural configurations of such electronic systems or the intermediate host system 108 are not relevant to the present disclosure and, hence, no additional details thereof are provided here. Similarly, details of communication links or interfaces supporting the data communication between the unit 106 and the host computer 104, or between the unit 106 and the intermediate host system 108, or between the intermediate host system 108 and the host computer 104, as the case may be, are also not relevant to the present disclosure and, hence, are not discussed here.

Figure 2:
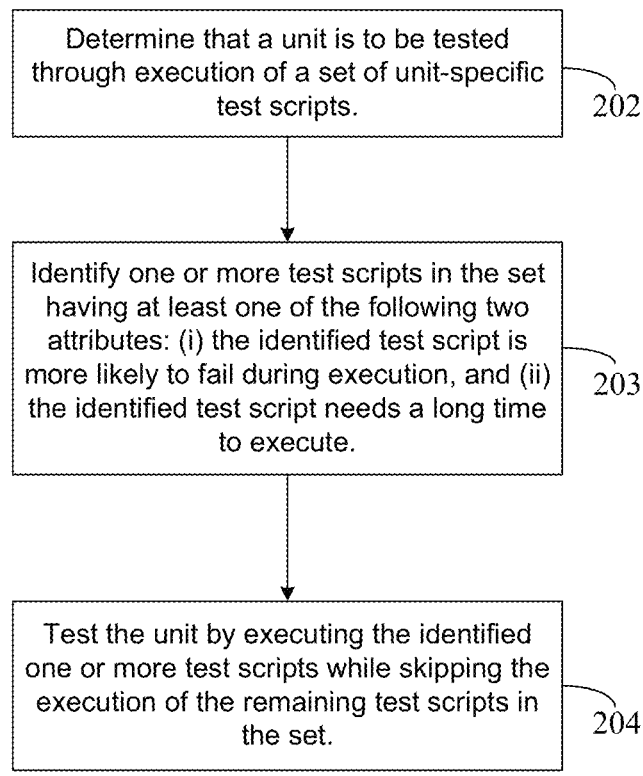
FIG. 2 is an exemplary flowchart depicting various steps that may be performed by a computing system as per particular embodiments of the present disclosure to test a unit.

The program code for the prioritization tool 102 may be stored in a memory (not shown) in the host computer 104 and executed by a processor (not shown) in the host computer 104 under operative control of an Operating System (OS) 110 of the host computer 104. Upon execution of the program code for the prioritization tool 102 by a processor (not shown) in the host computer 104, the host computer 104 may perform different operations to select a prioritized list of test scripts for testing the unit 106. An exemplary set of such operations is illustrated in FIG. 2, which is discussed later below. In one embodiment, the prioritization tool 102 may be a Microsoft® Windows® tool. Although the discussion herein primarily focuses on a Microsoft® Windows® based operating system (such as, for example, Windows XP, Windows 7, 8, or 10, and Windows NT operating systems), a prioritization tool as per the teachings of the present disclosure may be implemented in a host computer having a different operating system.

FIG. 2 is an exemplary flowchart 200 depicting various steps that may be performed by a computing system as per particular embodiments of the present disclosure to test a unit, such as the unit 106 in FIG. 1. In one embodiment, the computing system may be the host computer 104, when the intermediate host system 108 is absent. If the intermediate host system 108 is present, the host computer 104 and the intermediate host system 108 collectively may be considered as the "computing system". In other testing arrangements, the "computing system" may include a single information handling system or a combination of multiple information handling systems. However, as noted before, architectural details of all such testing arrangements are not relevant to the present discussion and, hence, constituent blocks of each such "computing system" are not identified or discussed here. More generally, the computing system performing the steps shown in FIG. 2 may include in hardware and/or software the functionality of the script tool 102 and, hence, the computing system may be considered as implementing the script prioritization-based product testing functionality as per teachings of the present disclosure. In one embodiment, the program code for the script tool 102 (and other relevant program code such as the program code for the OS 110) may be executed by a processor (not shown) in the computing system and, upon execution of the program code, the computing system may be operative to perform the tasks illustrated in FIG. 2 (as well as other tasks or steps discussed later with reference to FIGS. 3-10). For ease of discussion, only the reference numeral "104" may be used below, simply by way of an example, to refer to the "computing system" being discussed with the relevant figure (such as FIG. 2). It is noted, however, that such usage shall not restrict the "computing system" to the host computer 104 alone. Rather, as mentioned here, in certain embodiments, one or more additional information handling systems—such as, for example, the intermediate host system 108 in FIG. 1—also may form a part of the "computing system" implementing the teachings of the present disclosure.

Initially, at block 202, the computing system may determine that a unit/commodity, such as the unit 106 in FIG. 1, is to be tested through execution of a set of unit-specific test scripts. As discussed in more detail below, in particular embodiments, the computing system may sense when the unit is electrically connected to it and, in response, the computing system may receive or extract the unit's part number from the unit. Based on the unit's part number, the computing system may retrieve a list of the test scripts included in the set of unit-specific test scripts. In certain embodiments, the set of unit-specific test scripts may be stored in the computing system or made available to it prior to the commencement of the testing of a batch of identical units 106. The set of unit-specific test scripts may include all of the test scripts associated with the testing of the unit 106. However, as mentioned before, the present disclosure relates to prioritization of execution of certain test scripts while omitting the execution of others in the set. Hence, as part of this prioritization, the computing system may identify one or more test scripts in the set having at least one of the following two attributes: (i) the identified test script is more likely to fail during execution, and (ii) the identified test script are time consuming to execute (block 203). As discussed in more detail later with reference to FIGS. 3-10, the prioritization aspect may involve training and using an ML model by the computing system to identify the subset of script(s) having the above-mentioned attributes. Once the relevant test scripts are identified for prioritized execution, the computing system may test the unit 106 by executing one or more test scripts identified at block 203, while skipping the execution of the remaining test scripts in the set (block 204). In case of the exemplary arrangement 100 in FIG. 1, the task at block 202 may be performed by the intermediate host system 108, the task at block 203 may be performed by the host computer 104, and the task at block 204 may be performed by the intermediate host system 108. Regardless of which entity performs a specific task, the methodology shown in FIG. 2 may lead to efficient testing of commodities by omitting execution of many test scripts that do not need to be executed, thereby saving the overall test time.

Figure 3:
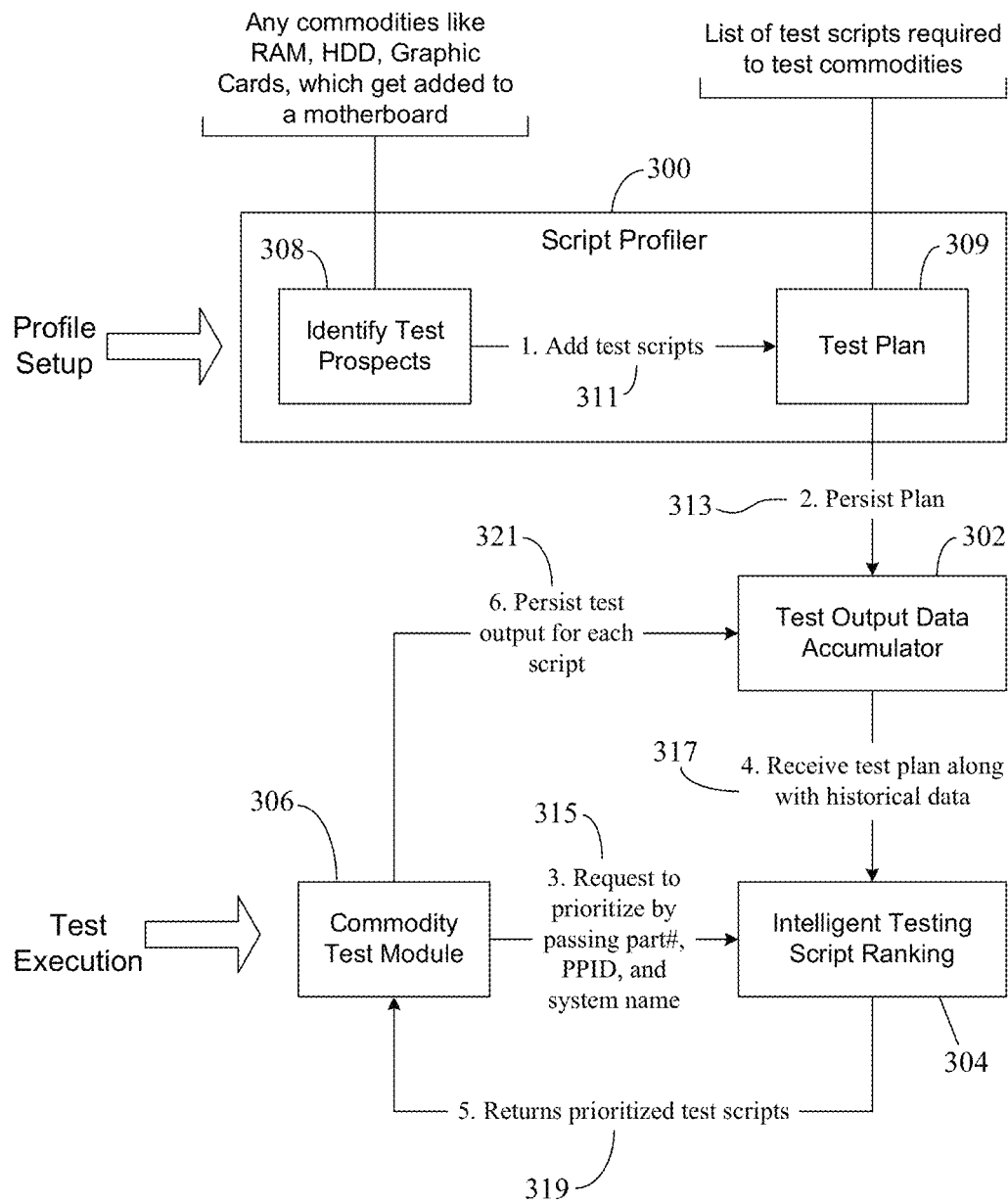
FIG. 3 depicts exemplary software modules that may be part of a test script prioritization tool as per particular embodiments of the present disclosure.

FIG. 3 depicts exemplary software modules that may be part of a test script prioritization tool, such as the tool 102 in FIG. 1, as per particular embodiments of the present disclosure. At a high level, the script prioritization tool 102 may comprise of the following four modules: a script profiler module 300, a test output data accumulator module 302, an intelligent testing script ranking module 304, and a commodity test module 306. The script profiler 300 may be used to setup the test profile of a commodity to be tested such as, for example, Random Access Memories (RAMs), Hard Disk Drives (HDDs), graphic cards, and the like, which get added to a motherboard. The script profiler 300 may identify the test prospect/commodity (block 308)—whether a RAM, an HDD, and so on—and define (and store) a commodity-specific test plan (block 309), which may include a list of test scripts required to test the commodity. This is illustrated by task-1 (labeled "Add test scripts") at arrow 311. More particularly, the script profiler 300 may map a pre-defined set of test attributes against the commodity to be tested. These attributes may include the test script name(s), the part number (of the commodity under test), the name of the system (the host computer 104 or the intermediate host system 108) to which the part is connected for testing, the number of test samples/results to be collected—for example, either for a day (regardless of whether a similar commodity has been tested before and First Article Inspection (FAI) quota is met) or only when the commodity is introduced for testing (until the FAI quota is met). Whenever a test is performed, the script profiler 300 may capture relevant test data/results against these attributes and send them to a repository or database (not shown) for future reference. The database may be a part of the system memory of the host computer 104 or an external database operatively connected to the host computer 104. Generally, in one embodiment, the basic purpose of the script profiler module 300 may be to define a unit-specific set of test scripts that are to be run for a given unit/commodity.

The data accumulator 302 may be a module that persists test outputs for each unit-specific test script in the test plan against the corresponding unit/commodity under test, as illustrated by task-2 (labeled "Persist Plan") at arrow 313. The data accumulator module 302 may communicate with the test data repository (mentioned above) associated with the script profiler 300 to capture test output/result (pass or fail) against each unit-specific test script along with the part number of the corresponding unit, a Piece Part Identification (PPID) associated with the part number, each failure time (if any) of the script, and the average execution time of the script (for example, during a test run of specified interval or during the time period for which test samples/results are collected involving the script). As discussed later, the script ranking module 304 may use the data provided by the data accumulator 302 for training an ML model. It is noted here that the PPID numbers may be used by a manufacturer as a means to identify and/or track individual components. The PPID numbers also can be used to determine the age and the part number of a particular part if that part may require warranty service. In particular embodiments, PPID numbers may contain a variety of information such as, for example, the manufacturing date of a component, where it was manufactured (or the country of origin), manufacturer of the component, the part number of the component, and so on. It is noted that two commodities belonging to the same class of products (such as, for example, 16 GB RAMs) and, hence, having the same part number, may still have different PPIDs because of a number of reasons such as, for example, they may be manufactured by different entities or in different locations or on different dates, and so on.

The commodity test module 306 may sense the attachment of the commodity to a System Under Test (SUT) and then perform actual tests on the commodity. In case of the configuration 100 in FIG. 1, the intermediate host system 108 may be considered an SUT. The commodity test module 306 may communicate with an appropriate module in the intermediate host system 108 or may have a portion of it running on the intermediate host system 108 to sense when the commodity 106 is attached to the intermediate host 108 for testing. On the other hand, in case the commodity 106 is directly attached to the host computer 104, the host computer 104 may be considered an SUT. The test module 306 may have visibility on the list of unit-specific test scripts that are to be executed. Thus, in case of the configuration in FIG. 1, the portion of the test module 306 running on the intermediate host system 108 may be able to receive, store, and execute the relevant test scripts for the unit 106. When the intermediate host system 108 is absent, the test module 306 on the host computer 104 may perform all the relevant tasks. Whether the test module 306 performs its tasks in a divided or undivided manner is not relevant to the present discussion and, hence, additional details thereof are not provided. Generally, before the testing begins, the SUT—whether the intermediate host system 108 or the host computer 104—may have all test scripts relevant for testing the unit 106 stored therein, for example, by an operator (or test personnel) or automatically downloaded from another system (not shown). As discussed below, the commodity test module 306—with the help of the script ranking module 304—may select one or more of those scripts for the actual testing.

In certain embodiments, the test module 306 may receive the PPID associated with the unit 106—for example, through communication with the unit 106 itself or through an operator input—when the unit 106 is attached to the SUT for testing. As mentioned before, the PPID may identify the part number of the unit under test (RAM, HDD, and so on) and can also identify the vendor and/or supplier of the unit 106. The test module 306 may supply unit-specific details to the script ranking module 304 to seek its input on which scripts are to be executed to test the unit 106, as illustrated by task-3 (labeled "Request to prioritize") at arrow 315. The input from the script ranking module 304 would indicate which script executions can be prioritized and which can be skipped. The unit-specific details at arrow 315 may include, for example, the unit's part number, PPID associated with the part number, and the name (or other identifier) of the SUT—whether the host computer 104 itself or the intermediate host system 108, as applicable—to which the unit 106 is connected for testing. The script ranking module 304 may act on the request at arrow 315 and, using the information supplied through the request (such as, for example, the part number, PPID, and system name), may retrieve a unit-specific test plan along with corresponding historical test data (for the past executions of the scripts on the test plan) from the data accumulator module 302, as illustrated by task-4 (labeled "Receive test plan") at arrow 317. Based on the type of the unit (RAM, HDD, graphic card, and the like) identified by the unit's part number (or PPID), the test plan at arrow 317 may include the list of unit-specific test scripts recommended by the script profiler 300 as discussed earlier.

As discussed in more detail later, the script ranking module 304 may use the data (at arrow 317) provided by the data accumulator 302 to perform AI-based data mining for training an ML model. As discussed in more detail later, based on the analysis of the historical test data from the data accumulator 302, the ML model may be trained to identify one or more test scripts having at least one of the following two attributes: (i) the test script is more likely to fail during execution, and (ii) the test script are time consuming to execute. While the ML model is being trained, all of the test scripts listed on the test plan at arrow 317 may be executed. However, once the ML model is already trained, the model may rank the test scripts listed on the test plan received at arrow 317 and provide a list of ranked scripts to the test module 306 so as to guide the test module 306 as to which test scripts are to be run and which to be skipped, as illustrated by task-5 (labeled "Returns prioritized test scripts") at arrow 319. The test module 306 may send execution result (or test output) for each script executed by it (as per instructions from the script ranking module 304) to the data accumulator module 302, as illustrated by task-6 (labeled "Persist test output for each script") at arrow 321. In certain embodiments, the test results at task-6 may be reported to the script profile 300, which may, in turn, update the earlier-mentioned repository or database (not shown) for future reference by the data accumulator module 302. The test results at arrow 321 may provide historical test data to allow the script ranking module 304 to further train/fine-tune the ML model during future iterations of the testing process.

Figures 4, 6:
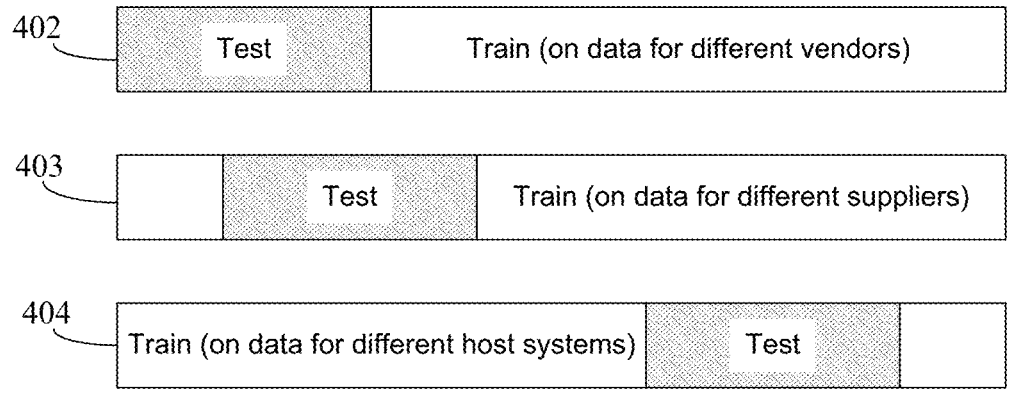
FIG. 4 shows an exemplary illustration of different datasets considered for training an ML model in certain embodiments of the present disclosure.
FIG. 6 is an exemplary table showing execution requirements for different test scripts during training of an ML model as per particular embodiments of the present disclosure.

FIG. 4 shows an exemplary illustration 400 of different datasets considered for training an ML model in certain embodiments of the present disclosure. As discussed in more detail later with reference to FIGS. 5-6, as part of training the ML model, each unit-specific test script may be executed—for example, by the test module 306 as per instructions from the script ranking module 304—a predetermined number of times for every other unit that is identical to the unit 106 (for example, 16 GB RAMs), until a pre-defined number (such as, for example, the FAI count as discussed later) of such other units are tested. Such testing may be performed for all different types of commodities (for example, 32 GB RAMs, 1 TB hard drives, graphic cards, and so on) to collect sufficient test data for training the ML model. The execution-specific test results for each executed test script may be collected by the data accumulator module 302. The results may contain three types of datasets that the script ranking module 304 may use to train the ML model: (i) a first dataset linking the execution results of the corresponding test script with a vendor of the respective unit under test, (ii) a second dataset linking the execution results of the corresponding test script with a supplier of the respective unit under test, and (iii) a third dataset linking the execution results of the corresponding test script with the SUT where the respective unit is tested.

As shown at block 402 in FIG. 4, the script ranking module 304 may use a portion of the first dataset (related to test results for different vendors) to train the ML model and the remaining portion (shown hatched) to test the performance of the ML model being trained. Similarly, as shown at block 403, the script ranking module 304 may use a portion of the second dataset (related to test results for different suppliers) to train the ML model and the remaining portion (shown hatched) to test the performance of the ML model being trained. Finally, as shown at block 404, the script ranking module 304 may use a portion of the third dataset (related to test results for different SUTs or host systems) to train the ML model and the remaining portion (shown hatched) to test the performance of the ML model being trained. In one embodiment, such Train:Test split of data may be 70:30, but other ratios may be used as well. For example, a "60:40 Train:Test split" would mean that 60% of data is used for training, whereas 40% is used for testing; an "80:20 Train:Test split" would mean that 80% of data is used for training, whereas 20% is used for testing; and so on. Furthermore, as indicated by the non-overlapping nature of the hatched portions in FIG. 4, the ML model may be trained on one dataset while being tested on another. In other words, it may not be necessary for the ML model to be trained or tested on all datasets simultaneously.

The ML model may facilitate clustering and ranking of test scripts as discussed later with reference to FIGS. 7-9. In doing so, the ML model may take into consideration the potential failures of test scripts in different commodities such as, for example, 32 GB RAMs from SK Hynix supplied by supplier "Sup-1" for the product family "X", or 32 GB RAMs from Samsung supplied by supplier "Sup-2" for the same product family "X" or another product family "Y", and so on. The ML model may be validated using the K-fold cross-validation method. Cross-validation is a model validation technique for assessing how the results of a statistical analysis (by the ML model) will generalize to an independent data set. It is used in the setting where one wants to estimate how accurately a predictive model (here, the ML model) will perform in practice. In particular embodiments, if the ML model gives 100% accuracy (with tolerance for some outliers) by applying the K-fold method, then the ML model may be considered as "trained." The average accuracy of a test script against the three datasets (at blocks 402-404 in FIG. 4) may be used as a measure of the script's accuracy. Once the ML model is trained (as discussed in more detail later), the script ranking module 304 may use the trained ML model to identify the test scripts—from the list received as part of the test plan at arrow 317 in FIG. 3—whose executions are to be prioritized and the scripts whose executions may be safely skipped by the commodity test module 306. In one embodiment, the ML model may use Fuzzy C-means clustering model to measure dissimilarity based on recent error and execution time. This may create a number of groups, compute the difference between the groups that meet a pre-defined threshold value.

Figure 5:
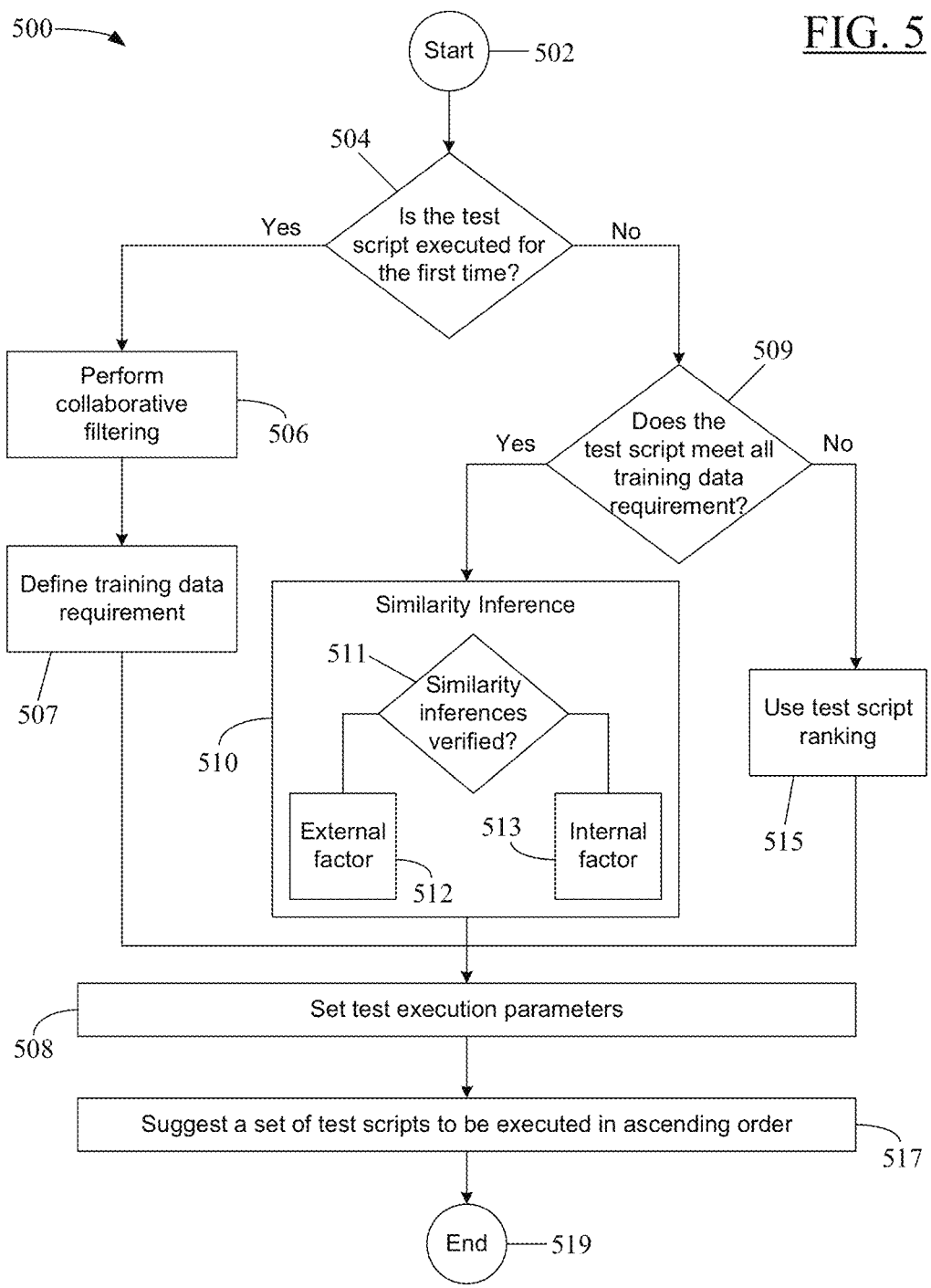
FIG. 5 is an exemplary flowchart depicting various steps that may be performed by the test script prioritization tool of FIG. 1 to prioritize test scripts as per particular embodiments of the present disclosure.

FIG. 5 is an exemplary flowchart 500 depicting various steps that may be performed by the test script prioritization tool 102 of FIG. 1 to prioritize test scripts as per particular embodiments of the present disclosure. As in case of the flowchart 200 in FIG. 2, various steps shown in FIG. 5 may be performed by a computing system. As noted before, the computing system may be the host computer 104, when the intermediate host system 108 is absent. If the intermediate host system 108 is present, the host computer 104 and the intermediate host system 108 collectively may be considered as the "computing system". More generally, the computing system performing the steps shown in FIG. 5 may include in hardware and/or software the functionality of the script tool 102 and, hence, the computing system may be considered as implementing the script prioritization-based product testing functionality as per teachings of the present disclosure. In one embodiment, the program code for the script tool 102 (and other relevant program code such as the program code for the OS 110) may be executed by a processor (not shown) in the computing system and, upon execution of the program code, the computing system may be operative to perform the tasks illustrated in FIG. 5 (as well as other tasks or steps discussed later with reference to FIGS. 6-10).

The process illustrated in the flowchart 500 starts at block 502 when the commodity test module 306 calls the script ranking module 304 (at arrow 315 in FIG. 3) for instructions as to which scripts to execute for a commodity/unit under test. During the training phase of the ML model, the commodity under test may be a unit that is identical to the unit 106 (for example, a 16 GB RAM, or a 32 GB RAM, or a 1 TB HDD, and the like). After a pre-defined number (such as, for example, the FAI quota discussed below) of such identical units are tested and the ML model is initially trained, the prioritized list of scripts may be provided for testing the current unit 106. Based on the test plan and historical data received at arrow 317, the script ranking module 304 may determine at block 504—for each script in the test plan—if the script is being executed for the first time during the current testing period (or test cycle). If the script is being executed for the first time, the script ranking module 304 may perform collaborative filtering for that script at block 506 to define the training data requirement for the ML model (block 507). The blocks 506-507 collectively define the initial stage of testing when an article or commodity is introduced for testing (as part of a pre-defined batch of commodities to be tested) for the first time in the current test cycle and sufficient training data for the ML model is not yet collected. As an example, the test cycle may include a volume (or batch) of one thousand (1000) units planned for sampling/testing. At the collaborative filtering block 506, the script ranking module 304 may analyze the historical data (at arrow 317) to look for a prior execution of the test script for a similar commodity (as the current unit under test) in the same family of products. For example, if the unit under test is a 16 GB RAM for a product family "X", the task at block 506 may look for the relevant test script's execution for another 16 GB RAM for the same product family "X" in a different test cycle. If no prior execution data available, the script ranking module 304 may define a new training data requirement—such as, for example, a new First Article Inspection (FAI) quota or count—for the test script at block 507. In one embodiment, the test operator may manually provide the FAI count to the script ranking module 304. On the other hand, if a similar commodity was tested before using the same script, the script ranking module 304 may copy the First Article Inspection (FAI) quota used during the earlier test cycle involving the similar commodity to define the training data requirement at block 507. The FAI quota—for example, 20 units (out of the batch of 1000 units)—may define the number of commodities/units (identical to the unit 106) for which all of the test scripts listed in the test plan (at arrow 317) are to be executed to collect the test results as training data for the ML model. Each test script may be repeatedly executed a pre-determined number of times for every commodity in the FAI quota. Thus, the FAI count—whether newly-defined or earlier-established—may provide a pre-defined training parameter.

FIG. 6 is an exemplary table 600 showing execution requirements for different test scripts during training of an ML model—such as the ML model discussed earlier with reference to FIG. 4—as per particular embodiments of the present disclosure. In the table 600, ten test scripts—S1 through S10—are listed along with corresponding commodity-related information such as, for example, the product family (here, "ABC" family) of the commodities under test, the vendor (here, "V1" or "V2") of the commodities, the SUT or host system (here, "System 1") where the commodity is being tested, the identity of the human operator (here, "User 1") performing the testing or assembling/monitoring the test, the FAI quota (here, 20 commodities) associated with the script, the volume (or batch) of units (here, 1000 units) planned for sampling/testing using a given script, and the test execution parameter (here, 44 executions) for the script for a commodity falling under the FAI quota. As mentioned in the preceding paragraph, for a commodity falling under the FAI quota, the script ranking module 304 may require each test script associated with the commodity to be repeatedly executed a pre-determined number of times such as, for example, 44 times as shown in FIG. 6. It is noted here that multiple test scripts may be associated with the same commodity. For example, the unit-specific test scripts S1-S7 and S9-S10 may be executed on the same test batch of 1000 units. On the other hand, certain commodities may have a single test script associated therewith. For example, the test batch supplied by the vendor V2 may be tested using the test script S8 alone.

Referring now to FIG. 5, the pre-determined number of executions (for example, 44 executions in FIG. 6) may establish the initial test execution parameters at block 508 for each unit-specific script associated with a unit in the FAI quota. After the first execution of a test script, the decision block 504 may lead to the block 509 where the script ranking module 304 may determine whether the current test script meets all training data requirement. In other words, at block 509, the script ranking module 304 may check if the script is being executed for a commodity within the FAI quota or not. As long as the FAI quota is not reached, the decision block 509 may lead to a similarity inference task at block 510 where the script ranking module 304 may determine if all similarity inferences are verified (block 511) using external factors (block 512) and internal factors (block 513). As part of the similarity inference verification using external factors at block 512, the script ranking module 304 may match the result of the current execution of a script for a specific commodity against previous/historical test results (if any) of the same script for identical products/commodities from the same vendor and/or supplier. On the other hand, as part of the similarity inference verification using internal factors at block 513, the script ranking module 304 may match the result of the current execution of a script for a specific commodity against previous/historical test results (if any) of the same script for identical products/commodities tested under the same testing environment—such as, for example, the same SUT, the same operator, and the like. The identical products (considered at blocks 512, 513) may have been tested as part of different test batches during prior test runs at different times or different pre-defined time windows (such as, for example, past one month, past one week, past 48 hours, and the like). The previous test data may have been available at arrow 317 from the data accumulator module 302 (FIG. 3).

The evaluation of current test data vis-à-vis historical test data at block 510 may provide the different datasets—discussed earlier with reference to FIG. 4—for training the ML model. While the ML model is being trained, the execution of various scripts may continue based on the test plan received at arrow 317 (FIG. 3). The test scripts in the list of the scripts received in the test plan may be executed without any prioritization among the scripts. After a pre-defined number (such as, for example, the FAI quota discussed above) of units (identical to the current unit 106) are tested, the ML model may be considered to be initially trained. As discussed later with reference to FIGS. 7-9, the trained ML model may provide a prioritized ranking of the scripts for execution. This ranking may omit certain scripts that do not need to be executed at all. When the testing of the FAI quota is complete, the decision at block 509 may lead to the block 515, where the script ranking module 304 may use the test script ranking generated by the trained ML model to provide a prioritized list of scripts to the test module 306 at arrow 319 (FIG. 3) for testing the current unit 106. As noted at block 517, the prioritized list may suggest a set of test scripts to be executed in ascending order of their ranking. As mentioned before with reference to FIG. 3, the training or fine-tuning of the ML model may continue based on the test results at arrow 321. The process illustrated in the flowchart 500 ends at block 519.

Figure 8:
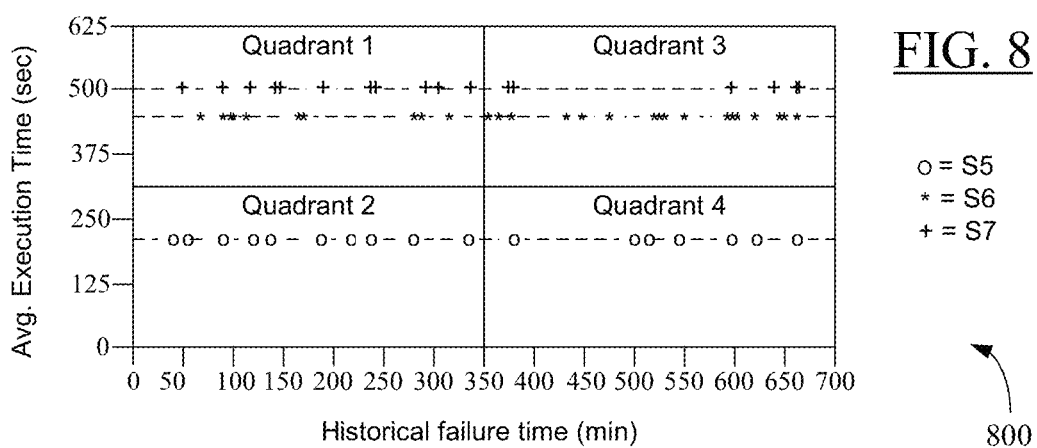
FIG. 8 shows an exemplary graph depicting quadrant-based classification of a group of test scripts for prioritization as per particular embodiments of the present disclosure.

FIGS. 7-9 collectively illustrate how the ML model may be trained and various unit-specific test scripts may be ranked by the ML model—during training and thereafter—as per teachings of the present disclosure. In particular embodiments, the execution-specific results of each test script executed during testing of the commodities in the FAI quota may be used along with historical execution data (if available) for that script to train the ML model. More specifically, FIG. 7 is an exemplary table 700 containing sample failure data of certain test scripts for use in explaining the ML model-based script ranking functionality of the script ranking module 304 as per particular embodiments of the present disclosure. FIG. 8 shows an exemplary graph 800 depicting quadrant-based classification of a group of test scripts—here, the test scripts S5-S7 listed in the table 700 in FIG. 7—for prioritization as per particular embodiments of the present disclosure. Finally, FIGS. 9A-9C (collectively "FIG. 9") provide an exemplary illustration of how the group of test scripts shown in FIG. 8 may be ranked for execution as per particular embodiments of the present disclosure. It is understood that the test scripts S5-S7 are selected by way of an example only; the ranking methodology discussed with reference to FIGS. 7-9 remain applicable to all unit-specific test scripts that may be provided to the script ranking module 304 as part of the test plan at arrow 317 (FIG. 3).

Referring now to FIG. 7, the past execution failures of various test scripts are listed in the table 700 along with the part number for which a test script fails to execute completely, the PPID associated with the part number, the fail time of the script, the time difference (in hours) between the fail time and a current time, and the average execution time (in seconds) of the script. The scripts listed in the table 700 and their historical failure data (during prior test runs) may be a part of the test plan provided to the script ranking module 304 at arrow 317 (FIG. 3). In certain embodiments, the historical data may include a test script's earlier failures during the current test run as well to provide additional data for training the ML model. The other scripts that are included in the test plan, but do not have past failure data, are not be listed in the table 700. The "Time Difference" column helps to identify the latest failure of a test script in relation to the current time, which may be the time when the script ranking module 304 performs script ranking for the unit 106 under test. In the context of the table 700, the "current time" (to measure the time difference) is taken as 14:00:00 on 2018-06-28. Thus, from historical perspective, the most recent failure (with reference to this "current time") would be the failure of script S1 at item-13 in the table 700 and the second most-recent failure would be the failure of script S2 at item-17 in the table 700. If the "current time" is 14:00:00 on 2018-06-28, then the failure time at item-13 (approximated as 13:00:00) would be 73 hours old, and that at item-17 (approximated as 20:00:00) would be 114 hours old. Similar calculations for other failure times may be performed, for example, by the script ranking module 304 to arrive at the values in the "Time Difference" column in the table 700. The ML model implemented by the ranking module 304 may be trained on such historical failure data to enable it to identify in the future which scripts (in a unit-specific set of scripts recommended for execution by the script profiler 300) are more prone to failures and/or have longer (average) execution times.

In FIG. 8, historical failure times of three exemplary scripts—here, the test scripts S5-S7 listed in the table 700 in FIG. 7—are plotted against their average execution times (which are mentioned in the table 700) into one of four quadrants for training the ML model. In particular embodiments, such quadrant-based classification may be performed by the ranking module 304 to train the ML model to classify, at run time, which script(s) is more likely to fail during execution and/or are time consuming to execute. Although not shown in FIG. 8, such quadrant-based classification may be performed for all test scripts associated with the commodity under test to eventually rank the scripts in the manner discussed below with reference to FIGS. 9A-9C using the scripts S5-S7 as examples. In FIG. 8, historical failure times (in minutes) of a script are classified against their average execution time (in seconds) into one of four quadrants, where each quadrant is defined by a corresponding pre-determined range of failure times along the x-axis and a corresponding pre-determined range of average execution times along the y-axis. For example, in FIG. 8, the first quadrant (Quadrant 1) is defined by failure times between 0-350 minutes and average execution times between 312.5-625 seconds; the second quadrant (Quadrant 2) is defined by failure times between 0-350 minutes and average execution times between 0-312.5 seconds; and so on. It is noted here that the failure times plotted in FIG. 8 are different from those shown in FIG. 7 for the scripts S5-S7. Furthermore, the failure times in FIG. 8 are measured in minutes (as opposed to hours in FIG. 7) to illustrate the ongoing training, re-training, and fine-tuning of the ML model based on the most recent failure data of these scripts with reference to a fixed time instant, which may be selected by the ranking module 304—for example, arbitrarily at run time or pre-determined beforehand—for evaluation of the failure data.

As mentioned before, the basic purpose of the script ranking module 304 is to rank test scripts and guide the commodity test module 306 in which order it should run/execute the test scripts. The script ranking module 304 uses machine learning and data mining to rank the test scripts. The ML model implemented by the ranking module 304 may be trained on the sample data such as, for example, the script execution results plotted in FIG. 8, to prioritize the execution of those scripts that fall under "Quadrant 1" because scripts in this quadrant tend to take longer time to execute (with higher average execution times) and have failures that are more recent (implying that the scripts are more likely to fail). On the other hand, scripts falling under "Quadrant 4" tend to have old failures and low average execution times. It is understood that a script may fail multiple times during testing of a single commodity or at different times during testing of different commodities. In FIG. 9A, a table 900 is shown in which failure times of each of the scripts S5-S7 are listed in an ordered list—from the most recent failure to the most distant failure during the relevant time interval (for example, during the testing of the FAI quota, or during a pre-defined data sampling period, or any other time window for data collection). These failure times are also plotted in FIG. 8. The table 900 also provides a count of the total number of times an error is reported during execution of the relevant script (in the relevant time interval) and the average execution time of the script (which is also plotted in FIG. 8). For example, as plotted in FIG. 8 and listed in the table 900 in FIG. 9A, the script S5 has 17 failed executions, starting with the most recent failure time of 39 minutes and ending at the oldest failure time of 664 minutes. Similarly, the script S6 has a total of 27 failed executions, and the script S7 has a total of 17 failed executions.

In particular embodiments, the total number of failures of a script may be divided into ten (10) groups or quantile ranges, which may be used by the ML model to measure the density of each recent failure of each script. The quantile may be calculated using the following program statement: quantile (testOutputSTimeDifferenceInMinutes, prob=seq (0, 1, length=11)). For example, the quantile range of 0%-10% may be defined to include all failure times between 39 minutes (the most recent failure time in the error data listed in the table 900 in FIG. 9A) and 98.6 minutes, the quantile range of 10%-20% may include the failure times of 98.6 to 142.8 minutes, the quantile range of 20%-30% may include the failure times of 142.8 to 210.7 minutes, the quantile range of 30%-40% may include the failure times of 210.7 to 281.6 minutes, the quantile range of 40%-50% may include the failure times of 281.6 to 329.5 minutes, the quantile range of 50%-60% may include the failure times of 329.5 to 380.4 minutes, the quantile range of 60%-70% may include the failure times of 380.4 to 496.5 minutes, the quantile range of 70%-80% may include the failure times of 496.5 to 571 minutes, the quantile range of 80%-90% may include the failure times of 571 to 623.1 minutes, and the quantile range of 90%-100% may include the failure times between 623.1 to 673 minutes.

The ML model may count the total number of failures (of each script S5-S7) under each group of quantiles. In one embodiment, the following algorithmic steps may be used by the ML model to group errors in the table 900 against each quantile range and then classifying the errors according to the script name Step 1: READ "Time Difference in Minutes from database"
Step 2: ASSIGN error time into a variable errorslist
Step 3: SORT list of errorslist
Step 4: CREATE percentile of length 11 with errorlist
Step 5: ITERATE through list items (errorslist)
Step 6: IF list item (errorslist) falls under 1 quantile then check error belongs to which scripts
Step 7: Increment error count for script name as shown in the table 902 in FIG. 9B
Step 8: Repeat steps 5 through 7 for all quantiles The table 902 in FIG. 9B shows the script-specific failure times (listed in the table 900 in FIG. 9A) classified into corresponding quantile ranges in the manner discussed in the preceding paragraph. In the table 902, the quantile ranges are listed in rows and the corresponding failure counts for each script are listed in columns. For example, the script S5 has three (3) failure times-39 minutes, 51 minutes, and 86 minutes—falling under the first quantile range of 0-10%, whereas the script S7 has only two (2) failure times-47 minutes and 88 minutes—falling under the first quantile range. Thus, the first row (0-10% quantile range) has the entry "3" under the column "Total # S5 failure" and the entry "2" under the column "Total # S7 failure". Similar entries are computed for other rows. It is observed that the "failure count" or total of all rows (covering 0-100% quantile range) for each column in the table 902 in FIG. 9B would equal the script-specific value-17 for script S5, 27 for script S6, and 17 for script S7—in the "Total # of times error" row in the table 900 in FIG. 9A.

In one embodiment, an intermediate ranking of the scripts S5-S7 may be generated based on the density of their recent failures. This intermediate ranking is referred to as the "Failure Count rank" and listed in the last row of the table 902 in FIG. 9B. It is noted here that a script's failure-count rank may be different from its final rank (discussed below with reference to FIG. 9C) for execution prioritization. In one embodiment, the following algorithmic steps may be used by the ML model to sort scripts for intermediate ranking.

Step 1: GET all script names and error counts in their respective quantile(s)
Step 2: ASSIGN error count for 1 quantile into a variable rawErrorCount
Step 3: IF MAX error count is single value then add to sorted list
Step 4: REMOVE script name from rawErrorCount
Step 5: REPEAT steps 2 and 4 for all quantiles The above steps compare all scripts for total failure counts, and then sort/rank them by least failure counts. In other words, the failure-count rank in the table 902 ranks the scripts in an ascending order, starting with the script having the least failure count. Because each of the scripts S5 and S7 has the same failure count of 17 (which is also the least failure count), both of them are assigned the same rank "1". In one embodiment, such a "tie" may be broken by arbitrarily assigning rank "1" to one script and rank "2" to the other. In another embodiment, the "tie" may be broken by assigning the rank "1" to the script having the most recent failure time (here, script S5 having the earliest failure at 39 minutes) and rank "2" to the other.

Finally, a weighted matrix—such as the table 904 in FIG. 9C—may be created by the ML model for each script by evaluating various factors/criteria impacting ranking of the script using a corresponding weight (or Weightage Factor (WF)) for each criterion. In the table 904, these "Impacting Criteria" and their corresponding Weightage Factors (WFs) are listed in rows of the table. Broadly, the impacting criteria may be measures which improve manufacturing test cycle times. In particular embodiments, each criteria-specific weight may be a pre-defined value less than or equal to "1", with the total of all WFs equaling "1.0". Each WF may be based on system and business needs, and may be divided into a scale of 0 to 1. The parameter referred to as "Rating" (R) in the table 904 represents a comparative study of peers or other scripts when they are measured against the same criteria. On the other hand, the parameter referred to as "Score" is a multiplication of WF of a criterion with script rating "R".

In FIG. 9C, the "Execution Time" criterion may refer to the average execution time of a script during testing of commodities. Scripts may be rated for this criterion by sorting them in descending order. Thus, in the table 904, the script having the longest execution time—script S7—is given the highest rating (R) of "3", followed by script S6 with rating "2", and script S5 with rating "1". The weightage factor (WF) for the Execution Time criterion is defined as "0.40", resulting in the criterion-specific scores (WF*R) of 0.40, 0.80, and 1.20 for the scripts S5, S6, and S7, respectively, as shown. The "Fail Count" criterion may refer to the total number of failures by an individual script. Scripts may be rated for this criterion by sorting them in descending order. The "Fail Count" values in the table 904 are the same as those in the "Failure Count Rank" row in the table 902 in FIG. 9B. The WF for the Fail Count criterion is defined as "0.10", resulting in the criterion-specific scores (WF*R) of 0.10, 0.20, and 0.10 for the scripts S5, S6, and S7, respectively, as shown. If the same PPID fails more than once, the total number of retried executions of a script for such a frequently-failing PPID may be captured as the "Retry Frequency" criterion using, for example, a Test Retry (TR) counter in software. In one embodiment, a pre-determined number of retries may be allowed before rejecting the part. In another embodiment, a specific time period may be allowed for retries, and the part may be either cleared or rejected thereafter. The scripts may be rated for the "Retry Frequency" criterion in descending order. Thus, in the table 904, the script having the highest number of retries for a commodity (here, script S7) is given the highest rating of "3", followed by script S6 with rating "2", and script S5 with rating "1". The WF for the Retry Frequency criterion is defined as "0.30", resulting in the criterion-specific scores (WF*R) of 0.30, 0.60, and 0.90 for the scripts S5, S6, and S7, respectively, as shown. Finally, the "Recent Failure" criterion relates to the recency of a script's failure. Scripts may be rated for this criterion by sorting them in ascending order. Thus, in the table 904, the script having the most recent failure—script S5 (with the first failure at 39 minutes as shown in FIG. 9A)—is given the lowest rating (R) of "1", followed by script S7 with rating "2", and script S6 with rating "3". The WF for the Recent Failure criterion is defined as "0.20", resulting in the criterion-specific scores (WF*R) of 0.20, 0.60, and 0.40 for the scripts S5, S6, and S7, respectively, as shown.

The criteria-specific scores of each script may be totaled by the ML model to assign a "Total Score" to a script. Each script may be assigned a Final Rank based on its Total Score—the script (here, script S7) with the highest total score has the Final Rank of "1", followed by the script (here, script S6) with the second-highest total score, and so on. In particular embodiments, the scripts may be prioritized for execution based on the ascending order of their final ranks. Thus, in case of the scripts S5-S7 in FIG. 9C, the ML model in the script ranking module 304 may recommend that script S7 be executed first, followed by scripts S6 and S5. It is observed that the ranking methodology discussed with reference to FIG. 9C may be applied to rank scripts within a specific quadrant (such as, for example, Quadrant 1 in FIG. 8) or across all quadrants. Furthermore, as noted before, scripts S5-S7 are used by way of an example only; other scripts may be similarly classified into quadrants and ranked in the similar manner so that all of the scripts in a test plan can be ranked in a single, ascending order.

It is noted here that, in some embodiments, the tasks discussed with reference to FIGS. 7-9 may be carried out on an on-going basis—during the training of the ML model as well as after the ML model is considered "trained"—to continually improve the performance of the ML model. Furthermore, when a new script or a new SUT is introduced for the first time during testing a batch of commodities, the classification and ranking discussed with reference to FIGS. 7-9 may be needed to train the ML model to enable it to more accurately prioritize all the scripts associated with testing the batch of commodities.

More generally, in particular embodiments, the trained ML model may be used by the script ranking module 304 to intelligently select one or more quadrants (such as, for example, Quadrants 1 and 2 in FIG. 8) representing the scripts having shorter failure times and/or higher average execution times. For the selected quadrant(s), the ML model may rank—for example, in ascending order—each quadrant-specific script based on a weighted evaluation of a pre-defined set of criteria such as, for example, the criteria shown and discussed before with reference to FIG. 9C. Finally, based on the ascending order of ranking, the ML model (and, hence, the script ranking module 304) may recommend (to the commodity test module 306) one or more quadrant-specific test scripts to be executed for testing the unit under test (such as the unit 106 in FIG. 1), while skipping the execution of other test scripts listed in the test plan (at arrow 317 in FIG. 3) for the unit. The recommended scripts may be then executed by the test module 306 in their ascending order of ranking.

The discussion of FIGS. 9A-9C relates to the test scripts S5-S7 specific to the Quadrants 1 and 2 in FIG. 8 because these quadrants typically define a critical path to focus on—that is, the scripts in these quadrants are more likely to fail and/or take longer to execute. However, this may not be true for all components from different manufacturers and suppliers, different product families, different types of components, as well as for the number of orders in the pipeline to test. Thus, it is understood that, in certain embodiments, other quadrants—such as Quadrants 3 and 4 in FIG. 8—may not be neglected or scripts belonging to those quadrants may not be executed the last (or skipped from execution). In some testing environments, executions of the scripts in the Quadrants 3-4 may provide insights into some of the reasons why test runs for a particular commodity from a specific supplier/vendor are going wrong or consistently failing. Therefore, the AI-based ML model may intelligently perform clustering and ranking of the scripts by taking into consideration potential failures of scripts in different commodities (such as, for example, 32 GB RAM from SK Hynix supplied by the supplier "Sup-1" for the product family "X" or 32 GB RAM from Samsung supplied by a different supplier "Sup-2" for the same product family "X"). As mentioned before, in particular embodiments, if the ML model gives 100% accuracy (with tolerance for some outliers) by applying the K-fold method, then the ML model may be considered as "trained". The script ranking module 304 may use the trained ML model to identify the test scripts—from the list received as part of the test plan at arrow 317 in FIG. 3—whose executions are to be prioritized and the scripts whose executions may be safely skipped by the commodity test module 306.

Figures 10A, 10B:
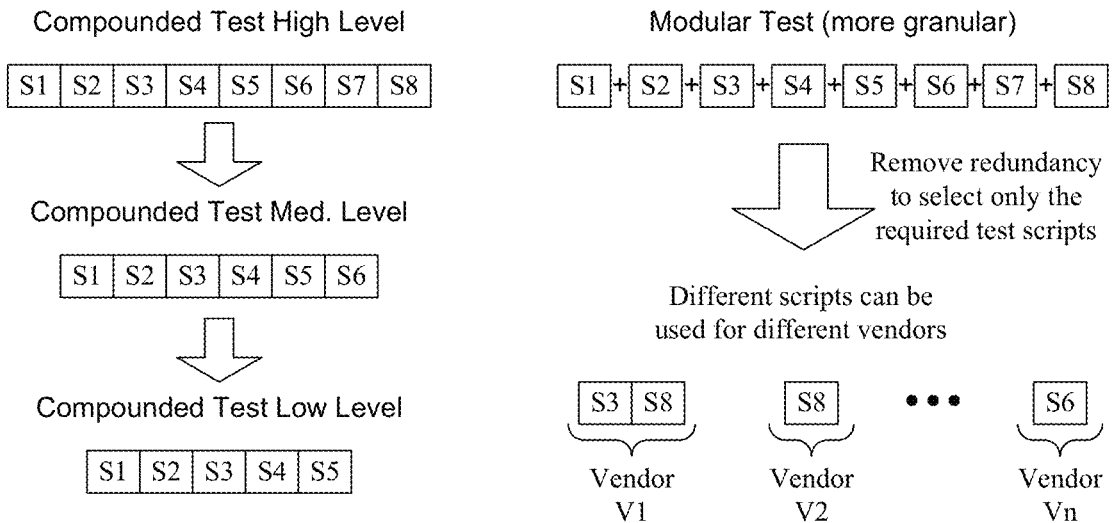
FIGS. 10A-10B depict two exemplary approaches for selecting scripts for testing a commodity as per particular embodiments of the present disclosure.

FIGS. 10A-10B (collectively "FIG. 10") depict two exemplary approaches for selecting scripts for testing a commodity as per particular embodiments of the present disclosure. FIG. 10A shows a compounded test approach, whereas FIG. 10B shows a more granular, modular test approach. In the compounded test approach, executions of a few of the test scripts may be skipped based on the recommendation from the ML model, but this partially-flexible approach still does not leave the compounded test lean enough to offer full benefits of script prioritization. For example, as shown in FIG. 10A, in a high level compounded test, scripts S1-S8 may be selected for execution from a set of unit-specific test scripts—for example, scripts S1-S10. The scripts S9-S10 may be omitted from execution based on the prioritization recommendation (at arrow 319 in FIG. 3) from the script ranking module 304. The remaining scripts—here, scripts S1-S8—may be executed in the order of their ranking (not shown in FIG. 10A). In a medium level compounded test, script S7-S8 may be dropped, and only the scripts S1-S6 may be executed in the order of their ranking. Still further, if a low level compounded test is preferred, only the scripts S1-S5 may be executed in the order of their ranking. Although some scripts are dropped from execution, the compounded test approach still may result in a significant number of test scripts being executed, thereby reducing the time-saving benefit that can be fully realized by the granularity offered through script prioritization. In a more granular approach, such as the modular test approach shown in FIG. 10B, the redundancy may be removed and only the required test scripts may be executed. For example, if a single script or a group of scripts takes up 30%-40% of overall execution time (involving all scripts in the unit-specific test plan), then the granularity offered by script prioritization as per teachings of the present disclosure may allow the script ranking module 304 to recommend execution of only such time-consuming scripts, while completely omitting the execution of the rest. Similarly, the analysis of historical test data may allow the ML model to recommend different scripts for products from different vendors (for example, scripts S3 and S8 for products from vendor V1, only the script S8 for products from vendor V2, and so on), as shown in FIG. 10B. Thus, script selection can be customized based on the analysis of the historical performance of the scripts for the same type of products received from different vendors. In the modular test approach of FIG. 10B, unlike the compounded test approach in FIG. 10A, there may be no need to execute the same set of scripts when the batch of test products (for example, 32 GB RAM) is received from different vendors (or suppliers).

In summary, the test script prioritization methodology discussed above with reference to FIGS. 1-10 uses a script prioritization tool to intelligently prioritize the execution sequence of test scripts in a product testing environment.

This tool may create a repository of test outputs from the executions of test scripts and analyze the outputs to train and deploy an ML model that defines the priority of the scripts that are to be executed and the scripts whose execution may be skipped without affecting the quality of testing. Scripts that are more likely to fail and/or are time consuming to execute may be prioritized, while other scripts may be skipped. The ML model may rank the scripts based on the average execution time of the script, a count of the execution failures of the script, a count of the number of execution retries for the script, and the most recent failure time of the script. The scripts can be executed based on their rankings for efficiency and time-saving. Because of the selective executions of test scripts as per teachings of the present disclosure, excessive (and often unnecessary) testing may be avoided. In case of large scale product manufacturing and/or assembly operations, this can translate into significant savings in the overall product shipment time and reduce manufacturing backlog.

FIG. 11 illustrates an example configuration of a computer system, such as the host computer 104 in FIG. 1, that can be used to implement the test script prioritization tool described herein. As noted before, for ease of discussion, only the reference numeral "104" may be used to refer to the computer system (also referred to herein as "computing system") being discussed here. It is noted, however, that such usage shall not restrict the "computer system" to the host computer 104 alone. Rather, as mentioned here, in certain embodiments, one or more additional information handling systems—such as, for example, the intermediate host system 108 in FIG. 1—also may form a part of the "computer system" of FIG. 11 implementing the teachings of the present disclosure. In that case, the reference numeral "104" may collectively refer to the operative combination of such systems. The computer system (or computing device) 104 may be suitably configured to implement the functionality of the script prioritization tool 102 according to the teachings of the present disclosure. The computer system 104 may include one or more processors 1102, a memory unit 1104, an interface unit 1106 providing communication interfaces, one or more input devices 1108, one or more output devices 1110, and a peripheral storage unit 1112, connected to the processor 1102 as shown and configured to communicate with each other, such as via one or more system buses (not shown) or other suitable connection.

In one embodiment, the input devices 1108 may provide user inputs—such as user inputs (like commodity profile information, test execution commands, and the like) received during a test run—to the processor 1102 and the script tool 102 for further processing. The input devices 1108 may include, for example, a touchpad, a camera, a computer keyboard, a touch-screen, a joystick, a physical or virtual "clickable button," a computer mouse/pointing device, and the like. A display screen is an example of the output device 1110. Other examples of an output device include a graphics/display device, a computer screen or monitor, an alarm system, or any other type of data output device. In some embodiments, the input device(s) 1108 and the output device(s) 1110 may be coupled to the processor 1102 via an I/O or peripheral interface(s). In some embodiments, the host computer 104 may include more than one instance of the devices shown. In various embodiments, all of the components shown in FIG. 11 may be housed within a single housing. In other embodiments, the host computer 104 may not include all of the components shown in FIG. 11. Furthermore, the host computer 104 may be configured as a standalone system, as a server system, as a client system, or in any other suitable form factor.

The processor 1102 is a hardware device that may include a single processing unit or a number of processing units, all of which may include single or multiple computing units or multiple cores. When the computer system 104 is a multi-processor system, there may be more than one instance of the processor 1102 or there may be multiple processors coupled to the processor 1102 via their respective interfaces (not shown). The processor 1102 may include an integrated Graphics Processing Unit (GPU) or the GPU may be a separate processor device in the system 104. The processor 1102 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 1102 may be configured to fetch and execute computer-readable instructions stored in the memory 1104, the peripheral storage 1112, or other computer-readable media. In some embodiments, the processor 1102 may be a System on Chip (SoC).

The memory 1104 and the peripheral storage unit 1112 are examples of non-transitory computer media (e.g., memory storage devices) for storing instructions that can be executed by the processor 1102 to perform the various functions described herein. For example, the memory unit 1104 may include both volatile memory and non-volatile memory (e.g., RAM, ROM, or the like) devices. Further, in particular embodiments, the peripheral storage unit 1112 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 1104 and mass storage devices constituting the peripheral storage 1112 may be collectively referred to as memory or computer storage media herein, and may be a media capable of storing computer-readable, processor-executable program instructions as computer program code that can be executed by the processor 1102 as a particular machine configured for carrying out the operations and functions described in the implementations herein.

The computer system 104 may also include one or more communication interfaces as part of its interface unit 1106 for exchanging data via a network. The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet (or, more generally, the Internet Protocol (IP) network), and the like. Communication interfaces in the interface unit 1106 can also provide communication with external storage (not shown), such as in a storage array, network attached storage, storage area network, one or more databases, or the like.

The computer storage media, such as the memory 1104 and the mass storage devices in the peripheral storage 1112, may be used to store software and data. For example, the computer storage media may be used to store the operating system (OS) 110 for the host computer 104, various device drivers for the device 104, various inputs provided by the user during the script tool installation and implementation, and the data such as the test plan at block 309 (FIG. 3), test outputs, results of executions of test scripts, audio content, video content, text data, streaming content, or any other type of content. The computer storage media also may store software applications such as a word processing application, a spreadsheet application, the script tool 102, and the like. The program code for the software applications and the OS may be executed by the processor 1102.

In one embodiment, a non-transitory, computer-readable data storage medium, such as, for example, the system memory 1104 or the peripheral data storage unit 1112 may store program code or software for the script tool 102 as per particular embodiments of the present disclosure. In the embodiment of FIG. 11, the system memory 1104 is shown to include such program code. In the embodiment of FIG. 11, the script tool application 102 may operate in conjunction with the host OS 110 (FIG. 1). The processor 1102 may be configured to execute the program code for the script tool 102, whereby the host computer (or computer system) 104 may be operative to perform various data processing (such as, test data collection, storage, and analysis), script prioritization, and other tasks associated with the script tool 102 as per the teachings of the present disclosure. In one embodiment, such tasks may include, for example, the process steps illustrated in FIGS. 2 and 5 as well as other tasks discussed with reference to FIGS. 3-4 and 6-10 such as, for example, recommending a set of test scripts for testing a commodity, analyzing current and historical test data, identifying test scripts that are more likely to fail during the test, identifying the scripts that are time consuming to execute, classifying the scripts into quadrants, prioritizing the scripts for execution, and so on. The program code or software for the script tool 102 may be proprietary software or open source software which, upon execution by the processor 1102, may enable the computer system 104 to perform script prioritization and execution of scripts based on their ranking as per teachings of the present disclosure.

In particular embodiments, the computer system 104 may include an on-board power supply unit 1114 to provide electrical power to various system components illustrated in FIG. 11. The power supply unit 1114 may receive batteries or may be connectable to an AC electrical power outlet. In one embodiment, the power supply unit 1114 may convert solar energy or other renewable energy into electrical power.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The terms "module" or "mechanism" as used herein generally represents software, hardware, or a combination of software and hardware that can be configured to implement prescribed functions. For instance, in the case of a software implementation, the term "module" or "mechanism" can represent program code (and/or declarative-type instructions), such as the program code for the script tool 102, that performs specified tasks or operations when executed on a processing device or devices (e.g., CPUs or processors). The program code can be stored in one or more computer-readable memory devices or other computer storage devices. Thus, the processes/tasks and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method characterized by comprising:
   determining (202), by a computing system (104), that a first unit (106) is to be tested through execution of a set of unit-specific test scripts;
   identifying (203), by the computing system, one or more test scripts in the set having at least one of the following two attributes:
   the identified test script is more likely to fail during execution, and
   the identified test script are time consuming to execute;
   testing (204), by the computing system, the first unit by executing the identified one or more test scripts while skipping the execution of the remaining test scripts in the set;
   executing, by the computing system, each test script in the set a pre-determined number of times for every second unit until a pre-defined number of second units are tested, wherein each second unit is identical to the first unit;
   collecting, by the computing system, an execution-specific result for each test script in the set that is executed the pre-determined number of times for every second unit, wherein the execution-specific result for a corresponding test script in the set includes the following:
   a first data linking result of execution of the corresponding test script with a vendor of a respective second unit for which the corresponding test script is executed,
   a second data linking result of execution of the corresponding test script with a supplier of the respective second unit for which the corresponding test script is executed, and
   a third data linking result of execution of the corresponding test script with the computing system where the respective second unit is tested;
   training, by the computing system, a machine learning, ML, model using all execution-specific results for each test script in the set that is executed the pre-determined number of times for every second unit; and using, by the computing system, the trained ML model to identify the one or more test scripts to be executed for testing the first unit and those whose execution is to be skipped.

2. The method of claim 1, wherein the first unit is one of the following:
a component of an electronic system; and
the electronic system.

3. The method of claim, wherein the determining comprises:
sensing, by the computing system, that the first unit is electrically connected to the computing system;
receiving (315), by the computing system, a part number associated with the first unit; and
based on the part number, retrieving (317), by the computing system, a list of the test scripts in the set of unit-specific test scripts.

4. The method of claim 1, wherein the ML model is validated using a K-fold cross-validation method.

5. The method of claim 4, wherein training the ML model comprises performing the following for each test script in the set that is executed the pre-determined number of times:
analyzing, by the computing system, all execution-specific results for the corresponding test script in the set to determine the following:
an average execution time of the corresponding test script, and
each failure time when execution of the corresponding test script fails; and
classifying, by the computing system, each failure time of the corresponding test script against the average execution time thereof into one of four quadrants, wherein each quadrant is defined by a corresponding pre-determined range of failure times along an x-axis thereof and a corresponding pre-determined range of average execution times along a y-axis thereof.

6. The method of claim 5, wherein using the trained ML model comprises:
selecting, by the computing system, one or more quadrants associated with at least one of the following:
shorter failure times, and
higher average execution times;
for the selected one or more quadrants, ranking, by the computing system, each quadrant-specific test script based on a weighted evaluation of the following criteria:
the average execution time of the quadrant-specific test script,
a count of total number of failed executions of the quadrant-specific test script,
a count of total number of retried executions of the quadrant-specific test script for a frequently-failing Piece Part Identification, PPID, and
a most recent failure time of the quadrant-specific test script; and
based on an ascending order of the ranking, recommending (319), by the computing system, one or more quadrant-specific test scripts from the selected one or more quadrants as the identified one or more test scripts to be executed for testing the first unit.

7. The method of claim 6, wherein the testing comprises:
executing, by the computing system, the identified one or more test scripts in the ascending order of ranking.

8. A computing system (104) characterized by comprising:

a memory (1104, 1112) storing program instructions; and
a processing unit (1102) coupled to the memory and operable to execute the program instructions, which, when executed by the processing unit, cause the computing system to:
determine (202) that a first unit (106) is to be tested through execution of a set of unit-specific test scripts,
identify (203) one or more test scripts in the set having at least one of the following two attributes:
the identified test script is more likely to fail during execution, and
the identified test script are time consuming to execute,
test (204) the first unit by executing the identified one or more test scripts while skipping the execution of the remaining test scripts in the set,
execute each test script in the set a pre-determined number of times for every second unit until a pre-defined number of second units are tested, wherein each second unit is identical to the first unit;
collect an execution-specific result for each test script in the set that is executed the pre-determined number of times for every second unit, wherein the execution-specific result for a corresponding test script in the set includes the following:
a first data linking result of execution of the corresponding test script with a vendor of a respective second unit for which the corresponding test script is executed,
a second data linking result of execution of the corresponding test script with a supplier of the respective second unit for which the corresponding test script is executed, and
a third data linking result of execution of the corresponding test script with the computing system where the respective second unit is tested;
train a machine learning, ML, model using all execution-specific results for each test script in the set that is executed the pre-determined number of times for every second unit; and
use the trained ML model to identify the one or more test scripts to be executed for testing the first unit and those whose execution is to be skipped.

9. The computing system of claim 8, wherein the computing system comprises a combination of the following:
a first computer (108) to which the first unit and every second unit are electrically connected, wherein the first computer is configured to test the first unit and every second unit by executing relevant test scripts; and
a second computer (104) operatively connected to the first computer, wherein the second computer is configured to train a machine learning, ML model and, based on the trained ML model, identify the one or more test scripts to be executed for testing the first unit.

10. The computing system of claim 9, wherein the program instructions, upon execution by the processing unit, cause the computing system to perform the following for each test script in the set that is executed the pre-determined number of times:
analyze all execution-specific results for the corresponding test script in the set to determine the following:
an average execution time of the corresponding test script, and
each failure time when execution of the corresponding test script fails; and
classify each failure time of the corresponding test script against the average execution time thereof into one of four quadrants, wherein each quadrant is defined by a corresponding pre-determined range of failure times along an x-axis thereof and a corresponding pre-determined range of average execution times along a y-axis thereof.

11. The computing system of claim 10, wherein the program instructions, upon execution by the processing unit, cause the computing system to:
select one or more quadrants associated with at least one of the following:
shorter failure times, and
higher average execution times;
for the selected one or more quadrants, rank each quadrant-specific test script based on a weighted evaluation of the following criteria:
the average execution time of the quadrant-specific test script,
a count of total number of failed executions of the quadrant-specific test script,
a count of total number of retried executions of the quadrant-specific test script for a frequently-failing Piece Part Identification, PPID, and
a most recent failure time of the quadrant-specific test script; and
based on an ascending order of the ranking, recommend (319) one or more quadrant-specific test scripts from the selected one or more quadrants as the identified one or more test scripts to be executed for testing the first unit.

12. The computing system of claim 11, wherein the program instructions, upon execution by the processing unit, cause the computing system to:
execute the identified one or more test scripts in the ascending order of ranking.

13. A computer program product comprising a non-transitory computer-usable medium (1104, 1112) having computer-readable program code embodied therein, the computer-readable program code adapted to be executed by a computing system (104) to implement a method characterized by comprising the steps of:
determining (202) that a first unit (106) is to be tested through execution of a set of unit-specific test scripts;
identifying (203) one or more test scripts in the set having at least one of the following two attributes:
the identified test script is more likely to fail during execution, and
the identified test script are time consuming to execute; and
testing (204) the first unit by executing the identified one or more test scripts while skipping the execution of the remaining test scripts in the set;
executing, by the computing system, each test script in the set a pre-determined number of times for every second unit until a pre-defined number of second units are tested, wherein each second unit is identical to the first unit;
collecting, by the computing system, an execution-specific result for each test script in the set that is executed the pre-determined number of times for every second unit, wherein the execution-specific result for a corresponding test script in the set includes the following:
a first data linking result of execution of the corresponding test script with a vendor of a respective second unit for which the corresponding test script is executed,
a second data linking result of execution of the corresponding test script with a supplier of the respective second unit for which the corresponding test script is executed, and
a third data linking result of execution of the corresponding test script with the computing system where the respective second unit is tested;
training, by the computing system, a machine learning, ML, model using all execution-specific results for each test script in the set that is executed the pre-determined number of times for every second unit; and
using, by the computing system, the trained ML model to identify the one or more test scripts to be executed for testing the first unit and those whose execution is to be skipped.

* * * * *